US011591183B2

(12) United States Patent
Liaskas et al.

(10) Patent No.: US 11,591,183 B2
(45) Date of Patent: Feb. 28, 2023

(54) ENHANCING ELEVATOR SENSOR OPERATION FOR IMPROVED MAINTENANCE

(71) Applicant: Otis Elevator Company, Farmington, CT (US)

(72) Inventors: Peter Liaskas, Norwalk, CT (US); Nikola Trcka, West Hartford, CT (US); Sandeep Sudi, Farmington, CT (US); Leslie Lamontagne, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1097 days.

(21) Appl. No.: 16/234,692

(22) Filed: Dec. 28, 2018

(65) Prior Publication Data

US 2020/0207578 A1  Jul. 2, 2020

(51) Int. Cl.
*B66B 5/00* (2006.01)
*B66B 13/22* (2006.01)
*B66B 25/00* (2006.01)
*G01J 1/42* (2006.01)

(52) U.S. Cl.
CPC ............ *B66B 5/0025* (2013.01); *B66B 13/22* (2013.01); *B66B 25/006* (2013.01); *G01J 1/42* (2013.01)

(58) Field of Classification Search
CPC ..... B66B 5/0025; B66B 13/22; B66B 25/006; B66B 5/0037; B66B 5/005; B66B 1/2416; B66B 1/468; B66B 2201/30; B66B 2201/4607; G01J 1/42
See application file for complete search history.

(56) References Cited

U.S. PATENT DOCUMENTS

| | | | |
|---|---|---|---|
| 4,246,983 | A  | 1/1981 | Bril |
| 7,891,467 | B2 | 2/2011 | Kattainen et al. |
| 7,946,393 | B2 | 5/2011 | Thumm |
| 8,230,977 | B2 | 7/2012 | Thumm et al. |
| 8,327,553 | B2 | 12/2012 | Matzker et al. |
| 8,464,841 | B2 | 6/2013 | Birrer et al. |
| 8,540,057 | B2 | 9/2013 | Schuster et al. |
| 9,033,114 | B2 | 5/2015 | Mizon |
| 9,926,170 | B2 | 3/2018 | Michel et al. |

(Continued)

FOREIGN PATENT DOCUMENTS

| | | |
|---|---|---|
| CN | 2608470 Y | 3/2004 |
| CN | 1498842 A | 5/2004 |

(Continued)

OTHER PUBLICATIONS

CN Office Action for Application No. 201911376889.2; dated Dec. 28, 2020; 5 pages.

(Continued)

*Primary Examiner* — Jeffrey Donels
(74) *Attorney, Agent, or Firm* — Cantor Colburn LLP

(57) ABSTRACT

Methods and systems for enhancing sensor operation are provided. Aspects includes obtaining, by a primary sensor, primary sensor data associated with an electrical mechanical system, obtaining, by at least one secondary sensor, secondary sensor data associated with the electrical mechanical system, and analyzing the primary sensor data responsive to a determination of a predetermined state of the electrical mechanical system based on the secondary sensor data.

20 Claims, 4 Drawing Sheets

(56) References Cited

U.S. PATENT DOCUMENTS

| | | | |
|---|---|---|---|
| 10,106,374 B2 | 10/2018 | Cortona et al. | |
| 2015/0014098 A1* | 1/2015 | Stolzl | B66B 1/30 |
| | | | 187/394 |
| 2015/0284214 A1 | 10/2015 | Park et al. | |
| 2018/0162690 A1 | 6/2018 | Hsu et al. | |
| 2020/0071133 A1* | 3/2020 | Kelly | G01V 8/10 |
| 2020/0148504 A1* | 5/2020 | Pahlke | B66B 13/08 |

FOREIGN PATENT DOCUMENTS

| | | |
|---|---|---|
| CN | 101151201 A | 3/2008 |
| CN | 104816992 B | 8/2015 |
| CN | 104925613 B | 9/2015 |
| CN | 205555768 U | 9/2016 |
| EP | 3190075 A1 | 7/2017 |
| WO | 2018028989 A1 | 2/2018 |

OTHER PUBLICATIONS

Extended European Search Report; Application No. 19213342.9; Application Filed: Dec. 3, 2019; Search Report dated Jun. 9, 2020; 6 pages.

* cited by examiner

ENHANCING ELEVATOR SENSOR OPERATION FOR IMPROVED MAINTENANCE

BACKGROUND

The subject matter disclosed herein generally relates to elevator systems and, more particularly, to a system for enhancing elevator sensing data utilizing a secondary sensor.

In elevator systems, downtime for maintenance and repair is a driver in total cost of ownership and also contributes to inconvenience to building tenants and customers. Prognostic health monitoring (PHM) and condition based maintenance (CBM) have been tools utilized for reducing downtime in elevator systems. However, these maintenance systems rely on sensor-derived data from the operation of an elevator. This sensor-derived data is most useful when tied to certain operations of the elevator or locations of the elevator within a hoistway.

BRIEF DESCRIPTION

According to one embodiment, a system is provided. The system includes a primary sensor configured to obtain primary sensor data associated with an electrical mechanical system and at least one secondary sensor configured to obtain secondary sensor data associated with the electrical mechanical system, wherein primary sensor data obtained by the primary sensor is analyzed in response to a predetermined state of the electrical mechanical system being detected in secondary sensor data obtained by the secondary sensor.

In addition to one or more of the features described above, or as an alternative, further embodiments of the elevator system may include that the electrical mechanical system is an elevator system operating in a hoistway of a building.

In addition to one or more of the features described above, or as an alternative, further embodiments of the elevator system may include that the electrical mechanical system is at least one of an escalator system and a moving walkway.

In addition to one or more of the features described above, or as an alternative, further embodiments of the elevator system may include that the primary sensor data is analyzed by a controller and the controller is not configured to operate the electrical mechanical system.

In addition to one or more of the features described above, or as an alternative, further embodiments of the elevator system may include that the primary sensor obtains the primary sensor data responsive to an activation signal received from the controller.

In addition to one or more of the features described above, or as an alternative, further embodiments of the elevator system may include that the controller transmits the activation signal to the primary sensor responsive to determining the predetermined state of the electrical mechanical system based on the secondary sensor data.

In addition to one or more of the features described above, or as an alternative, further embodiments of the elevator system may include that the primary sensor obtains the primary sensor data responsive to a signal received from the at least one secondary sensor.

In addition to one or more of the features described above, or as an alternative, further embodiments of the elevator system may include that the predetermined state of the elevator system comprises a door for an elevator car being closed.

In addition to one or more of the features described above, or as an alternative, further embodiments of the elevator system may include that the primary sensor comprises a luminance sensor and the luminance sensor obtains light data associated with one or more lights in the elevator car in response to the door of the elevator car being closed.

In addition to one or more of the features described above, or as an alternative, further embodiments of the elevator system may include a controller configured to generate a maintenance request based on determining a status of the one or more lights in the elevator car being in need of maintenance.

According to one embodiment, a method is provided. The method includes obtaining, by a primary sensor, primary sensor data associated with an electrical mechanical system, obtaining, by at least one secondary sensor, secondary sensor data associated with the electrical mechanical system, and analyzing the primary sensor data responsive to a determination of a predetermined state of the electrical mechanical system based on the secondary sensor data.

In addition to one or more of the features described above, or as an alternative, further embodiments of the method may include that the electrical mechanical system is an elevator system operating in a hoistway of a building.

In addition to one or more of the features described above, or as an alternative, further embodiments of the method may include that the electrical mechanical system is at least one of an escalator system and a moving walkway.

In addition to one or more of the features described above, or as an alternative, further embodiments of the method may include that the primary sensor data is analyzed by a controller and the controller is not configured to operate the electrical mechanical system.

In addition to one or more of the features described above, or as an alternative, further embodiments of the method may include that the primary sensor obtains the primary sensor data responsive to an activation signal received from the controller.

In addition to one or more of the features described above, or as an alternative, further embodiments of the method may include that the controller transmits the activation signal to the primary sensor responsive to determining the predetermined state of the electrical mechanical system based on the secondary sensor data.

In addition to one or more of the features described above, or as an alternative, further embodiments of the method may include that the primary sensor obtains the primary sensor data responsive to a signal received from the at least one secondary sensor.

In addition to one or more of the features described above, or as an alternative, further embodiments of the method may include that the predetermined state of the electrical mechanical system comprises an elevator door for an elevator car being closed.

In addition to one or more of the features described above, or as an alternative, further embodiments of the method may include that the primary sensor comprises a luminance sensor and the luminance sensor obtains light data associated with one or more lights in the elevator car in response to the door of the elevator car being closed.

In addition to one or more of the features described above, or as an alternative, further embodiments of the method may include generating a maintenance request based on determining a status of the one or more lights in the elevator car being in need of maintenance.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
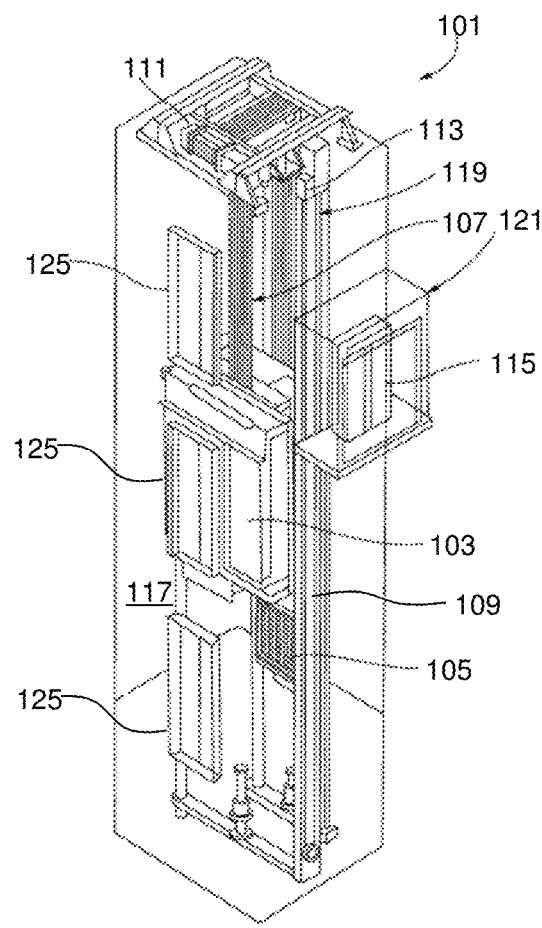
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
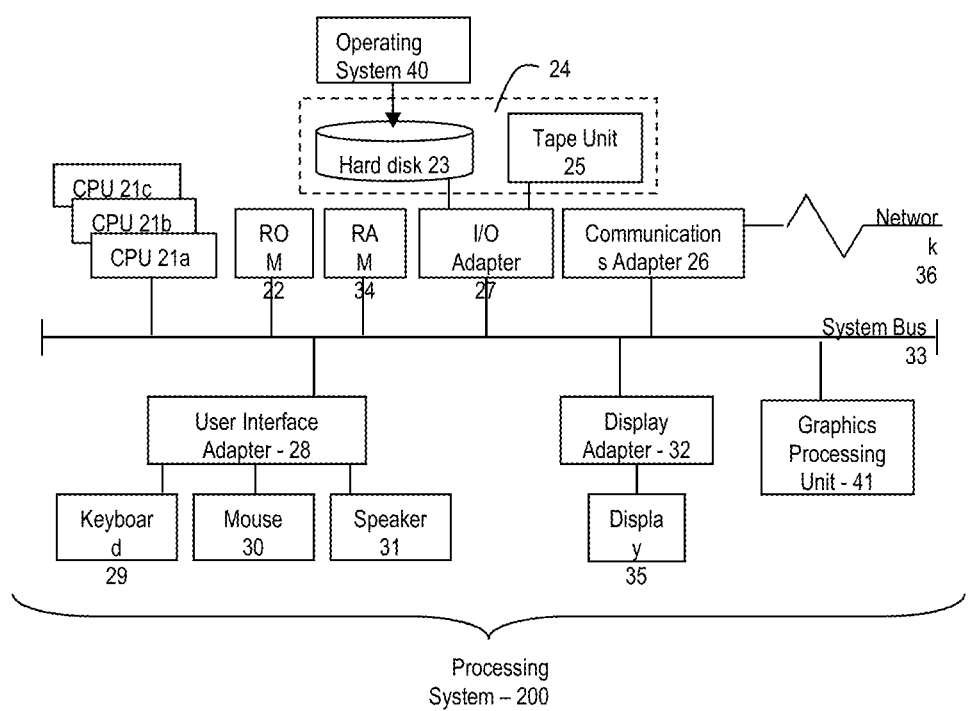
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, sensor-derived elevator data is utilized to improve maintenance efficiency by providing information about an elevator system and providing the data needed to run advanced analytics for preventative maintenance. However, when the maintenance system does not have access to elevator controller data, the need for external sensors is typically increased because the maintenance data is derived from the sensors only.

Turning now to an overview of the aspects of the disclosure, one or more embodiments address the above-described shortcomings of the above described technologies by providing systems and methods for enhancing elevator sensor operation. In one or more embodiments, secondary sensors in an elevator system are utilized to supplement and/or improve the accuracy of a primary sensor. For example, a primary sensor can collect data from an elevator system, but should collect this data under certain conditions for this data to be useful. The primary sensor is triggered to collect data when one or more secondary sensors detect a certain event. This allows for maintenance activities to be improved because the sensor data is tied to certain conditions. When elevator controller data is unavailable or difficult to access, the secondary sensors are utilized in lieu of the elevator controller for determining events such as an elevator car stopping at a floor landing or an elevator door opening or closing.

Figure 3:
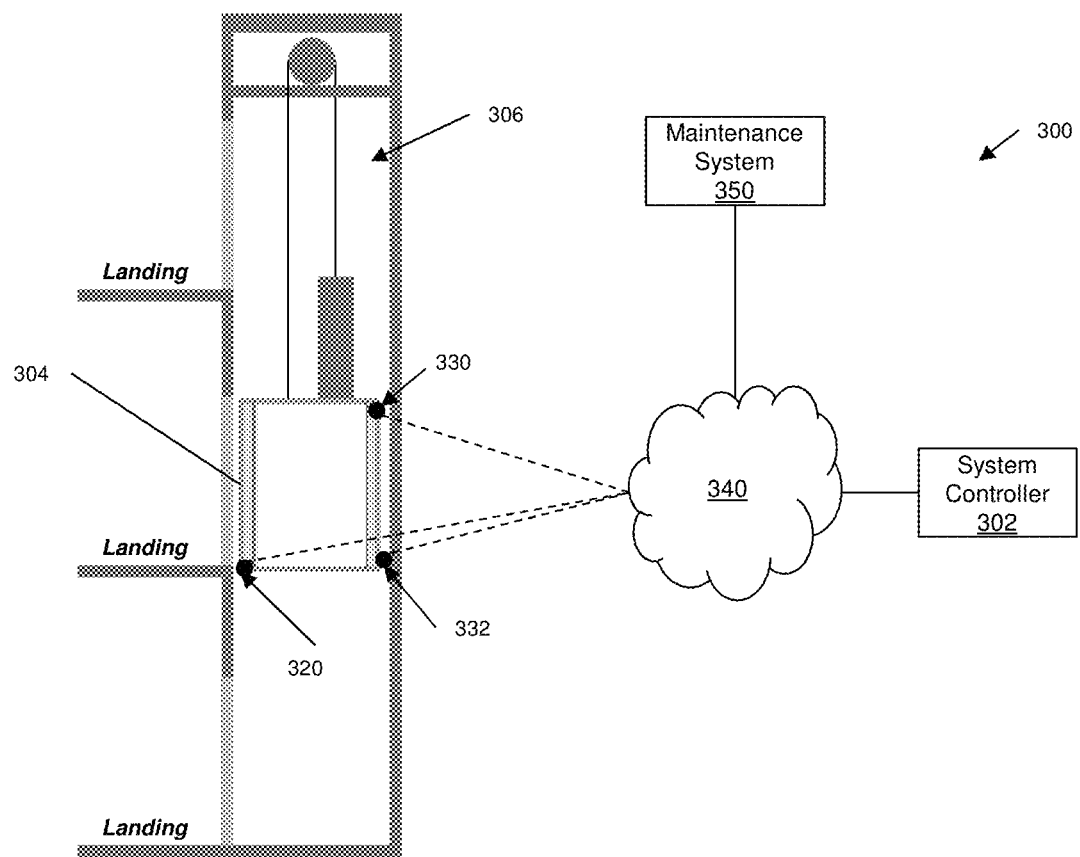
FIG. 3 depicts a system for enhancing elevator sensor operation according to one or more embodiments.

Turning now to a more detailed description of aspects of the present disclosure, FIG. 3 depicts a system 300 for enhancing elevator sensor operation according to one or more embodiments. The system 300 includes a system controller 302 configured to communicate with a primary sensor 320 and one or more secondary sensors 330, 332 (referred collectively as, the sensors 320, 330, 332). The sensors 320, 330, 332 can be in electronic communication with the system controller 302 through a network 340. In one or more embodiments, the network 340 can be a wireless or wired network. In one embodiment, the system controller 302 is a dedicated controller. In one embodiment, the system controller 302 is integrated with the elevator controller. In one embodiment, the system controller 302 is remote from the elevator installation and/or in the cloud. The system controller 302 can communicate through the network 340 or communicate directly with a maintenance system 350.

In one or more embodiments, the sensors 320, 330, 332 can be installed on various components of an elevator system. The elevator system can include an elevator car 304 operating in a hoistway 306 of a building. As mentioned above, sensor data collected from the primary sensor 320 is utilized better when certain conditions for collecting the data are met. For example, a luminance sensor is configured to collect data associated with the lighting inside an elevator car 304 such as a light outage. The luminance sensor (e.g., primary sensor 320) should only collect data when the doors of the elevator car 304 are fully closed so that the sensor data is not impacted by external factors such as light pollution from a landing hall way. The secondary sensors 330, 332 can detect the opening and closing of the elevator car and communicate the status of the elevator car door to the system controller 302. The system controller 302 can operate the primary sensor 320 (luminance sensor) when the state of the elevator car door is closed. These secondary sensors 330, 332 allow for better collection of primary sensor 320 data when access to the elevator controller is unavailable or difficult. Continuing with the above example, the system controller 302 can operate the primary sensor 320 (luminance sensor) to collect light data when there are no passengers in the elevator car 304. One of the secondary sensors 330, 332 can be a motion detection sensor that can collect motion data and transmit the motion data to the system controller 302 for processing. When the system controller 302 determines that no passengers are present in the elevator car 304, the primary sensor 320 can then be operated to collect light data in the elevator car 304. In one or more embodiments, the secondary sensors 330, 332 can communicate with the primary sensor 320 to trigger collection of sensor data without the need to transmit the secondary sensor data to the system controller 302.

In one or more embodiments, the primary sensor 320 and secondary sensors 330, 332 can continuously collect primary sensor data and secondary sensor data associated with the elevator car 304 and transmit this sensor data to the system controller 302. The system controller 302 can process this data and utilize the primary sensor data when the secondary sensor data indicates that certain conditions associated with the elevator car 304 have been met. In the luminance sensor example above, the primary sensor 320 can transmit light data to the system controller 302. The system controller 302 analyze the luminance sensor data when the data from the secondary sensors 330, 332 show the doors to be fully closed and the elevator car 304 is unoccupied, for example.

In yet another embodiment, the secondary sensors 330, 332 can trigger the collection of sensor data by the primary sensor 320 when certain conditions are met. Keeping with the above example, the primary sensor 320 (luminance sensor) can be triggered by the occurrence of certain data collected by the secondary sensors 330, 332. The triggering occurring when the elevator door is fully closed and the elevator car 304 is unoccupied which is determined by the secondary sensors 330, 332 (e.g., motion detection sensor and door sensors). Once the above condition is met, the secondary sensors 330, 332 can trigger the collection of primary sensor data (luminance data) from the primary sensor 320.

In one or more embodiments, the primary sensor 320 can be a floor-leveling accuracy sensor that is configured to monitor floor level and detect potential issues, such as gap between an elevator car 304 and a floor landing or an offset value for the elevator car compared to the landing. The secondary sensors 330, 332 can be, for example, floor identification sensors (e.g., RFID) and a door state sensor. These secondary sensors 330, 332 are utilized to supplement and improve the collection of floor leveling accuracy data from the primary sensor 320. For maintenance purposes, floor leveling data is needed when the doors are fully open when passenger transfer can occur. Also, the floor identification sensor can supplement the floor leveling accuracy data to make any maintenance activity more actionable. In one or more embodiments, the floor leveling accuracy sensor can measure offset values to determine if there are potential tripping hazards when the elevator car door is opened and passenger transfer can occur. The offset values can be compared to an offset threshold for determining an action to take by the system controller 302. For example, if an offset exceeds the offset threshold, an alarm can be generated to and sent to the maintenance system 350. Or, the alarm can be sent to a building manager to indicate the tripping hazard for the building manager to take action. In embodiments, the secondary sensors 330, 332 can be accelerometers affixed to a top of the elevator car 304 to determine that the elevator car 304 has come to a stop indicating the car 304 is at a floor. This could trigger the primary sensor 320 to collect data related to tripping hazards and leveling accuracy for the elevator car 304. The examples presented herein are merely exemplary and not intended to limit the application, uses, and/or technical scope of the present disclosure.

In one or more embodiments, the sensors 320, 330, 332 include a power supply that allows for autonomous installation on the elevator car 304 (i.e., no wired power connection is needed). The power supply can include a battery or a power harvesting circuit. To extend the life of the power supply, the sensors 320, 330, 332 can be operated by the system controller 302 in a low power mode and an operation mode. For example, a primary sensor 320 can be in a low power state and be woken up to collect data when an event occurs. The "wake-up" event can be determined from sensor data collected from the one or more secondary sensors 330, 332. The wake-up event can be from an output of an accelerometer or motion detection sensor. The primary sensor 320 can transition to an operational mode based on the wake-up event and begin transmitting data to the system controller 302. The sensor 320 can return to the low power mode based on a triggering by the system controller 302 or after the expiration of a set amount of time. For example, when an accelerometer output represents a wake-up event, the sensor 320 transitions to the operational mode and collects and transmits the sensor data to the system controller 302 for processing. A timer can be set by the system controller 302 or on the sensor 320 and at the expiration of the timer, the sensor 320 transitions back to the low power mode to conserve energy.

In one or more embodiments, the system controller 302 and sensor 310 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable cloud computing node and is not intended to suggest any limitation as to the scope of use or functionality of embodiments described herein.

In one or more embodiments, the sensors 320, 330, 332 can be affixed to a moving component of the elevator car 304 such as, for example, the top portion of the elevator car 304, the bottom or side portions of the elevator car 304, or any components in the hoistway 306. In yet another embodiment, the sensors 320, 330, 332 can be affixed to the door header of the elevator car 304 or affixed to locations on the inside of the elevator car 304.

In one or more embodiments, the sensors 320, 330, 332 can be affixed to components of an electrical mechanical system. The electrical mechanical systems can include escalators, moving walkways, and the like.

In one or more embodiments, the primary sensors 320 can be activated or triggered by a signal received from an elevator controller (not shown). The elevator controller, typically, controls the operations of the elevator car 304 within the building hoistway. The elevator controller can trigger the primary sensor 320 to collect sensor data based on a predefined state known to the elevator controller. The elevator controller can be in electronic communication with the system controller 302 and/or the primary sensor 320.

Figure 4:
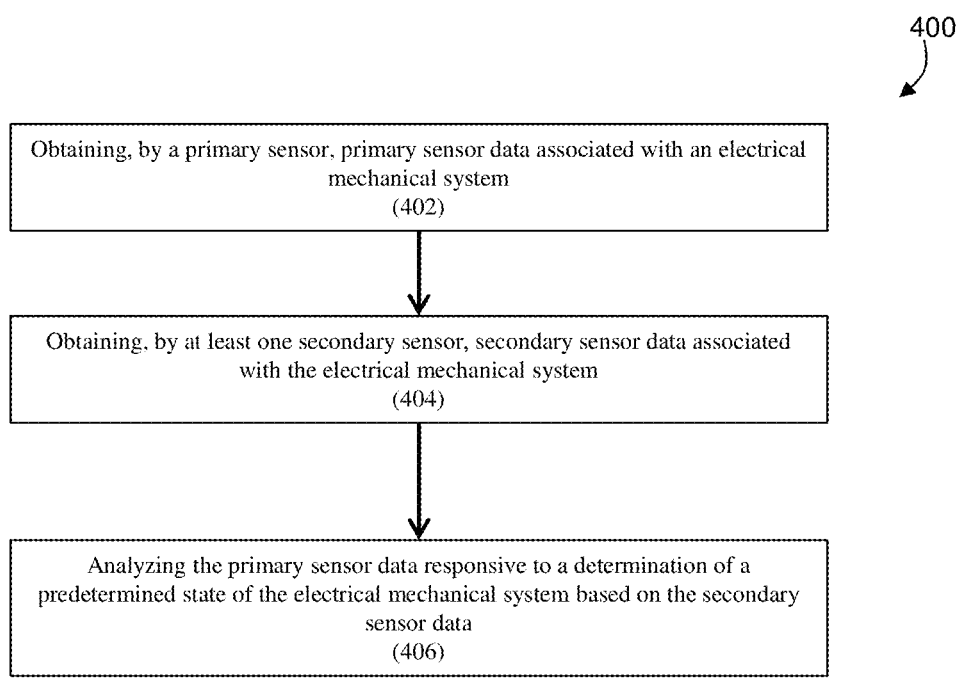
FIG. 4 depicts a flow diagram of a method for enhancing elevator sensor operation according to one or more embodiments of the disclosure.

FIG. 4 depicts a flow diagram of a method for enhancing elevator sensor operation according to one or more embodiments. The method 400 includes obtaining, by a primary sensor, primary sensor data associated with an electrical mechanical system, as shown in block 402. At block 404, the method 400 includes obtaining, by at least one secondary sensor, secondary sensor data associated with the electrical mechanical system. And at block 406, based at least in part on the state of the electrical mechanical system, the method 400 includes analyzing the primary sensor data responsive to a determination of a predetermined state of the electrical mechanical system based on the secondary sensor data.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for enhancing sensor operation, the system comprising:

a primary sensor configured to obtain primary sensor data associated with an electrical mechanical system; and at least one secondary sensor configured to obtain secondary sensor data associated with the electrical mechanical system;

wherein primary sensor data obtained by the primary sensor is analyzed in response to a predetermined state of the electrical mechanical system being detected in secondary sensor data obtained by the secondary sensor.

2. The system of claim 1, wherein the electrical mechanical system is an elevator system operating in a hoistway of a building.

3. The system of claim 1, wherein the electrical mechanical system is at least one of an escalator system and a moving walkway.

4. The system of claim 1, wherein the primary sensor data is analyzed by a controller; and wherein the controller is not configured to operate the electrical mechanical system.

5. The system of claim 4, wherein the primary sensor obtains the primary sensor data responsive to an activation signal received from the controller.

6. The system of claim 5, wherein the controller transmits the activation signal to the primary sensor responsive to determining the predetermined state of the electrical mechanical system based on the secondary sensor data.

7. The system of claim 1, wherein the primary sensor obtains the primary sensor data responsive to a signal received from the at least one secondary sensor.

8. The system of claim 1, wherein the predetermined state of the elevator system comprises a door for an elevator car being closed.

9. The system of claim 8, wherein the primary sensor comprises a luminance sensor; and wherein the luminance sensor obtains light data associated with one or more lights in the elevator car in response to the door of the elevator car being closed.

10. The system of claim 9, further comprising a controller configured to generate a maintenance request based on determining a status of the one or more lights in the elevator car being in need of maintenance.

11. A method for enhancing sensor operation, the method comprising:

obtaining, by a primary sensor, primary sensor data associated with an electrical mechanical system;

obtaining, by at least one secondary sensor, secondary sensor data associated with the electrical mechanical system;

analyzing the primary sensor data responsive to a determination of a predetermined state of the electrical mechanical system based on the secondary sensor data.

12. The method of claim 11, wherein the electrical mechanical system is an elevator system operating in a hoistway of a building.

13. The method of claim 11, wherein the electrical mechanical system is at least one of an escalator system and a moving walkway.

14. The method of claim 11, wherein the primary sensor data is analyzed by a controller; and wherein the controller is not configured to operate the electrical mechanical system.

15. The method of claim 14, wherein the primary sensor obtains the primary sensor data responsive to an activation signal received from the controller.

16. The method of claim 15, wherein the controller transmits the activation signal to the primary sensor responsive to determining the predetermined state of the electrical mechanical system based on the secondary sensor data.

17. The method of claim 11, wherein the primary sensor obtains the primary sensor data responsive to a signal received from the at least one secondary sensor.

18. The method of claim 11, wherein the predetermined state of the electrical mechanical system comprises an elevator door for an elevator car being closed.

19. The method of claim 18, wherein the primary sensor comprises a luminance sensor; and wherein the luminance sensor obtains light data associated with one or more lights in the elevator car in response to the door of the elevator car being closed.

20. The method of claim 19, further comprising generating a maintenance request based on determining a status of the one or more lights in the elevator car being in need of maintenance.

* * * * *